(12) United States Patent
Kneidl et al.

(10) Patent No.: US 11,165,304 B2
(45) Date of Patent: Nov. 2, 2021

(54) WINDING OF AN ELECTRICAL MACHINE, ELECTRICAL MACHINE AND METHOD FOR PRODUCING THE WINDING

(71) Applicant: Dr. Ing. h.c. F. Porsche Aktiengesellschaft, Stuttgart (DE)

(72) Inventors: Maximilian Kneidl, Ingolstadt (DE); Johannes Stoll, Schorndorf (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 95 days.

(21) Appl. No.: 16/420,230

(22) Filed: May 23, 2019

(65) Prior Publication Data
US 2019/0363601 A1 Nov. 28, 2019

(30) Foreign Application Priority Data

May 23, 2018 (DE) ...................... 10 2018 112 347.7

(51) Int. Cl.
*H02K 3/34* (2006.01)
*H02K 3/50* (2006.01)
*H02K 15/06* (2006.01)
*H02K 3/12* (2006.01)
*H02K 3/24* (2006.01)

(52) U.S. Cl.
CPC ............... *H02K 3/505* (2013.01); *H02K 3/12* (2013.01); *H02K 3/24* (2013.01); *H02K 3/345* (2013.01); *H02K 15/064* (2013.01)

(58) Field of Classification Search
CPC ............ H02K 3/345; H02K 3/12; H02K 3/24; H02K 3/505

(Continued)

(56) References Cited

U.S. PATENT DOCUMENTS 2,783,399 A 2/1957 Fenemore
3,943,392 A * 3/1976 Keuper ................. H02K 3/345
310/215

(Continued)

FOREIGN PATENT DOCUMENTS

CH 332979 A * 9/1958 ............... H02K 3/24
CH 332 979 11/1958

(Continued)

OTHER PUBLICATIONS

Machine translation of CH-332979-A. (Year: 1958).*

(Continued)

*Primary Examiner* — Michael Andrews
(74) *Attorney, Agent, or Firm* — Gerald E. Hespos; Michael J. Porco; Matthew T. Hespos

(57) ABSTRACT

Winding (12) of an electrical machine, having a plurality of winding segments (13), wherein each winding segment (13) respectively has at least two electrically conductive, hairpin-shaped or U-shaped or rod-shaped conductor elements (15), wherein the conductor elements (15) of each winding segment (13) are surrounded, in a central section thereof, by electrically insulating insulation (16) while leaving ends of the conductor elements free, and wherein each conductor element (15) of each winding segment (13) is connected in an electrically conductive manner to a conductor element (15) of another winding segment at the ends. Projections (17) which are made from an electrically insulating material and are used as spacers are applied to sections of the insulation (16) of the conductor elements (15) and bound sections of the coolant channels (18) for directly cooling the conductor elements (15).

10 Claims, 5 Drawing Sheets

(58) Field of Classification Search
USPC .......................................................... 310/215
See application file for complete search history.

(56) References Cited

U.S. PATENT DOCUMENTS

| | | | | |
|---|---|---|---|---|
| 4,633,116 A | * | 12/1986 | Derderian | ................ H02K 3/24 |
| | | | | 310/214 |
| 9,647,502 B2 | | 5/2017 | Takahashi et al. | |
| 2014/0346918 A1 | | 11/2014 | Uchitani et al. | |
| 2015/0326086 A1 | * | 11/2015 | Takahashi | ................ H02K 3/34 |
| | | | | 310/45 |
| 2017/0104377 A1 | * | 4/2017 | Kudose | .................... H02K 3/32 |
| 2017/0324295 A1 | * | 11/2017 | Tomonaga | ............. H02K 3/522 |

FOREIGN PATENT DOCUMENTS

| | | |
|---|---|---|
| CN | 103023167 | 4/2013 |
| DE | 718 359 | 3/1942 |
| DE | 1 017 265 | 12/1954 |
| DE | 10 2013 225 130 | 6/2015 |
| JP | 2018078764 A * | 5/2018 |

OTHER PUBLICATIONS

Machine translation of JP-2018078764-A. (Year: 2018).*
German Search Report dated Jan. 30, 2019.
Chinese Office Action dated Dec. 18, 2020.

* cited by examiner

WINDING OF AN ELECTRICAL MACHINE, ELECTRICAL MACHINE AND METHOD FOR PRODUCING THE WINDING

CROSS REFERENCE TO RELATED APPLICATION

This application claims priority under 35 USC 119 to German Patent Appl. No. 10 2018 112 347.7 filed on May 23, 2018, the entire disclosure of which is incorporated herein by reference.

BACKGROUND

Field of the Invention

The invention relates to a winding of an electrical machine, to an electrical machine and to a method for producing the winding.

Related Art

An electrical machine has a stator and a rotor. The stator of an electrical machine comprises a stator laminated core and a winding that is accommodated by the stator laminated core.

DE 10 2013 225 130 A1 discloses a winding of an electrical machine. The winding disclosed there is composed of plural winding segments. Each winding segment comprises electrically conductive conductor elements that have electrically insulating insulation at least in sections on the outside. The conductor elements may be hairpin-like or U-shaped or rod-shaped conductor elements. Hairpin-shaped or U-shaped conductor elements also are referred to as hairpins. Rod-shaped conductor elements are referred to as I-pins. DE 10 2013 225 130 A1 discloses that a winding segment comprises two conductor elements that are surrounded by the electrically insulating insulation in a central section while leaving ends of the conductor elements free. The conductor elements are angled or bent at the ends that are left free, and each conductor element of each winding segment is connected in an electrically conductive manner to the conductor element of another winding segment at one end. The winding segments connected to one another form a cage-shaped winding.

A further winding of a stator of an electrical machine is known from U.S. Pat. No. 9,647,502 B2. According to this prior art, the winding comprises plural winding segments made of electrically conductive, hairpin-shaped or U-shaped conductor elements. Two insulation means are applied to the conductor elements and completely encase the electrically conductive conductor elements in a central section. No insulation is present at free ends of the conductor elements so that the winding segments can be connected in an electrically conductive manner in the region of the ends of the conductor elements.

Heat is produced during operation of an electrical machine and must be dissipated. Known electrical machines are cooled in the region of the stator so that thermal energy arising during operation in the region of the winding of the stator is dissipated via the stator laminated core. In this case, the winding dissipates the heat to the stator laminated core and that heat then is dissipated from the stator laminated core by cooling. This restricts the cooling efficiency.

There is a need for a novel winding of an electrical machine, for an electrical machine having such a winding and for a method for producing such a winding so that the electrical machine, namely the stator, can be cooled more effectively.

The object of the invention is to provide a novel winding, a novel electrical machine and a method for producing the winding.

SUMMARY

According to the invention, projections that are made of an electrically insulating material are used as spacers. The projections are applied to sections of the insulation of the conductor elements and bound sections of the coolant channels for directly cooling the conductor elements.

In the winding according to the invention, the conductor elements have insulation. Projections formed from an electrically insulating material are used as spacers and are applied to sections of the insulation. The projections bound coolant channels for directly cooling the conductor elements of the winding by leading coolant through the cooling channels.

Such direct cooling of the conductor elements of the winding makes it possible to dissipate heat from the stator. As a result, a higher continuous power can be provided by the electrical machine. During insertion of the winding into the stator laminated core, the spacers prevent contact between the conductor elements having the insulation and a groove base of grooves in the stator laminated core that accommodate the conductor elements. As a result, it is possible to dispense with groove base insulating paper, which, in known electrical machines, is positioned between the conductor elements of the winding and the stator laminated core in the grooves in the stator laminated core.

The projections may extend in the axial direction of the conductor elements between the ends of the conductor elements. The projections may run in a rectilinear manner in the axial direction of the conductor elements between the ends of the conductor elements.

In one embodiment, the projections are used as spacers and bound sections of the coolant channels. Such projections can be produced easily by injection molding. The coolant flows through the coolant channels that run in the axial direction and are bounded by the projections running in the axial direction of the conductor elements.

An electrical machine having the winding of the invention can provide a high continuous power and a higher torque over a longer period.

Recesses may be made in grooves in the stator laminated core, which accommodate the conductor elements of the winding segments of the winding and bound, together with the projections applied to the conductor elements, the coolant channels for directly cooling the conductor elements, in which recesses the projections of the winding segments engage in sections. The projections of the winding engage in recesses in the stator laminated core, the coolant channels can be provided, on the one hand, and a compact design in the region of the stator for the electrical machine can also be provided.

Exemplary embodiments of the invention are explained in more detail on the basis of the drawing without being restricted thereto.

DETAILED DESCRIPTION

The invention relates to an electrical machine, to a winding of an electrical machine and to a method for producing the winding.

An electrical machine has a stator and a rotor.

Figure 1:
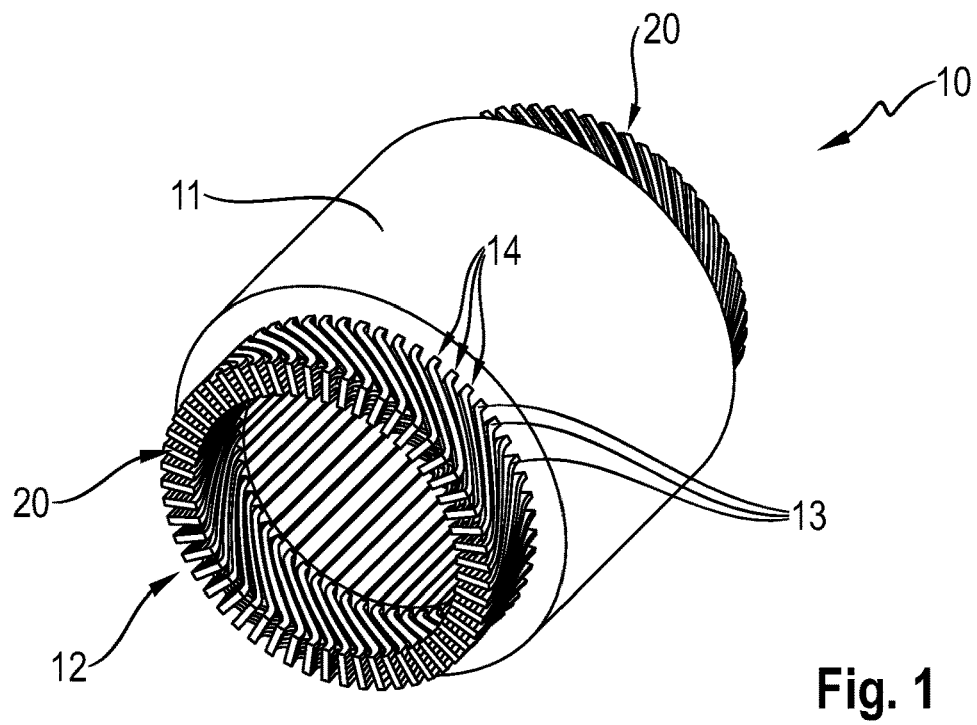
FIG. 1 is a perspective view of a stator of an electrical machine.
Figure 2:
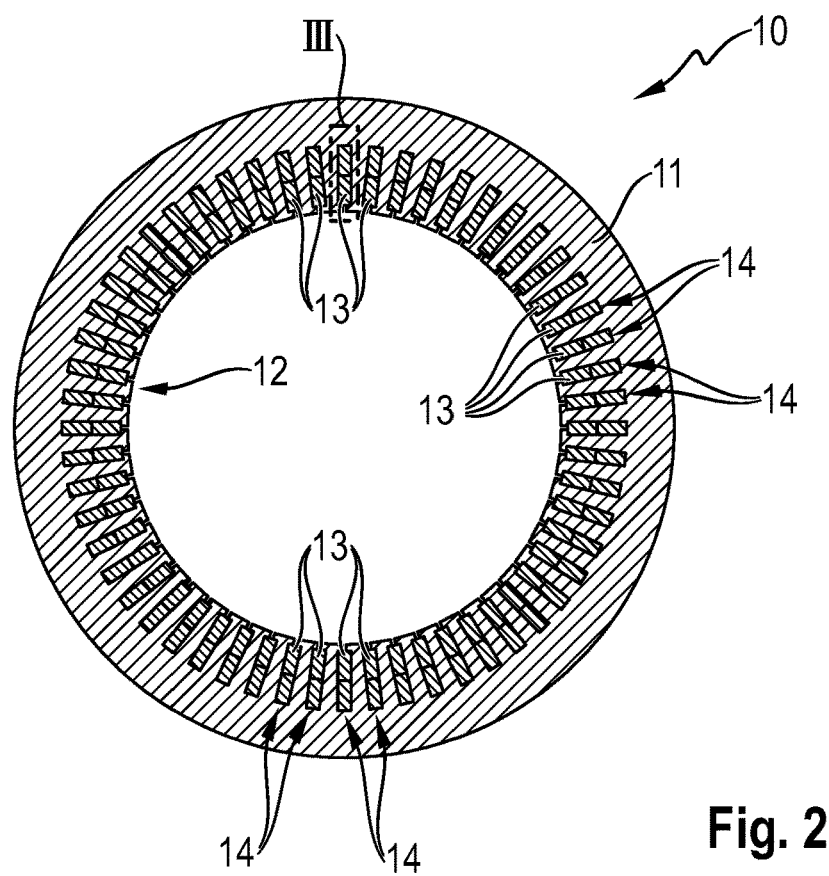
FIG. 2 is a cross section through the stator in FIG. 1.

FIGS. 1, 2 show a stator 10 of an electrical machine. The stator 10 has a stator laminated core 11 and a winding 12. The winding 12 of the stator 10 of the electrical machine is composed of a plurality of winding segments 13. Each winding segment 13 is positioned in a groove 14 in the stator laminated core 11.

Each winding segment 13 of the winding 12 has at least two electrically conductive, hairpin-shaped or U-shaped or rod-shaped conductor elements 15. In the embodiment of FIGS. 1 to 4, each winding segment 13 comprises two electrically conductive conductor elements 15 that may be hairpin-shaped or U-shaped or rod-shaped.

Hairpin-shaped or U-shaped conductor elements also are referred to as hairpin conductor elements. Rod-shaped conductor elements also are referred to as I-pin conductor elements.

The conductor elements 15 of a winding segment 13 are arranged beside one another or above one another in a row or column and form a strip of conductor elements 15.

The conductor elements 15 are surrounded, at least in a central section thereof, by electrically insulating insulation 16 while leaving ends of the conductor elements free. This insulation 16 is also referred to as primary insulation and insulates the conductor elements 15 of a winding segment 13, which are combined in rows or columns to form a strip, with respect to one another. The primary insulation 16 may be enamel insulation or wound insulation.

The conductor elements 15 have the electrical insulation 16 wherever the winding segments 13 or conductor elements 15 of the winding segments 13 are arranged or guided in the grooves 14 in the stator laminated core 11. In contrast, the ends 20 of the conductor elements 15 are not coated with the electrical insulation 16 at ends 20 of the conductor elements 15 that protrude or project from the stator laminated core 11 so that bent or angled ends of the conductor elements 15 of a winding segment 13 can be connected in an electrically conductive manner to conductor elements 15 of adjacent winding segments 13.

The winding segments 13 that are connected in an electrically conductive manner form a winding cage of the winding 12 of the stator 10 of the electrical machine.

Projections 17 that are composed of an electrically insulating material are used as spacers and are applied to sections of the insulation 16 of the conductor elements 15 of a winding segment 13.

The projections 17 that are used as spacers define or bound sections of coolant channels 18 together with the stator laminated core 11, namely together with walls of the groove 14 in the stator laminated core 11 that accommodates the respective winding segment 13.

Coolant flows through the coolant channels 18 formed in this manner during operation and thereby directly or immediately cool the conductor elements 15 of the winding segments 13. Heat that arises during operation optimally can be dissipated directly by the winding 12 by means of such direct cooling of the conductor elements 15 of the winding segments 13 of the winding 12 of the stator 10.

This makes it possible to provide a high torque over a long period so that the electrical machine can provide a high continuous power.

In the embodiment in FIGS. 1 to 4, the projections 17 that are used as spacers and bound sections of the coolant channels 18 run in a rectilinear manner in the axial direction of the conductor elements 15 between the ends of the conductor elements 15.

The projections 17 at least extend in that section of the conductor elements 15 that runs inside the respective groove 14 in the stator laminated core 11.

Figure 3:
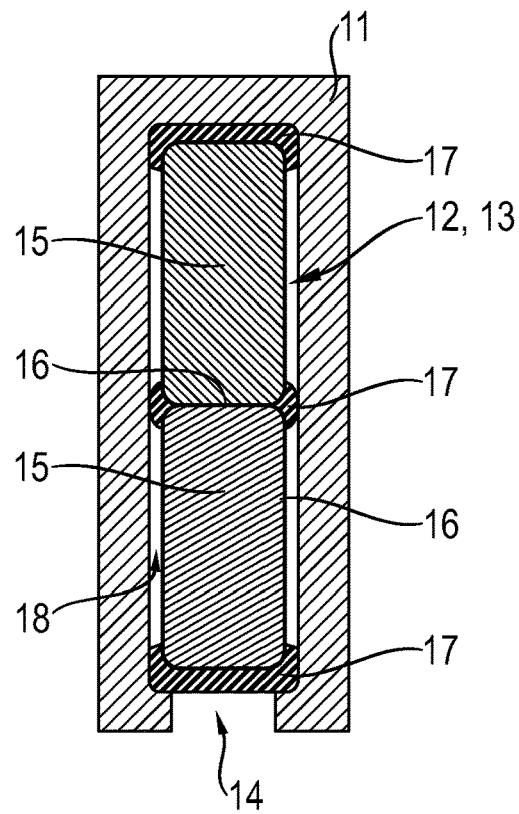
FIG. 3 shows detail III in FIG. 2.
Figure 4:
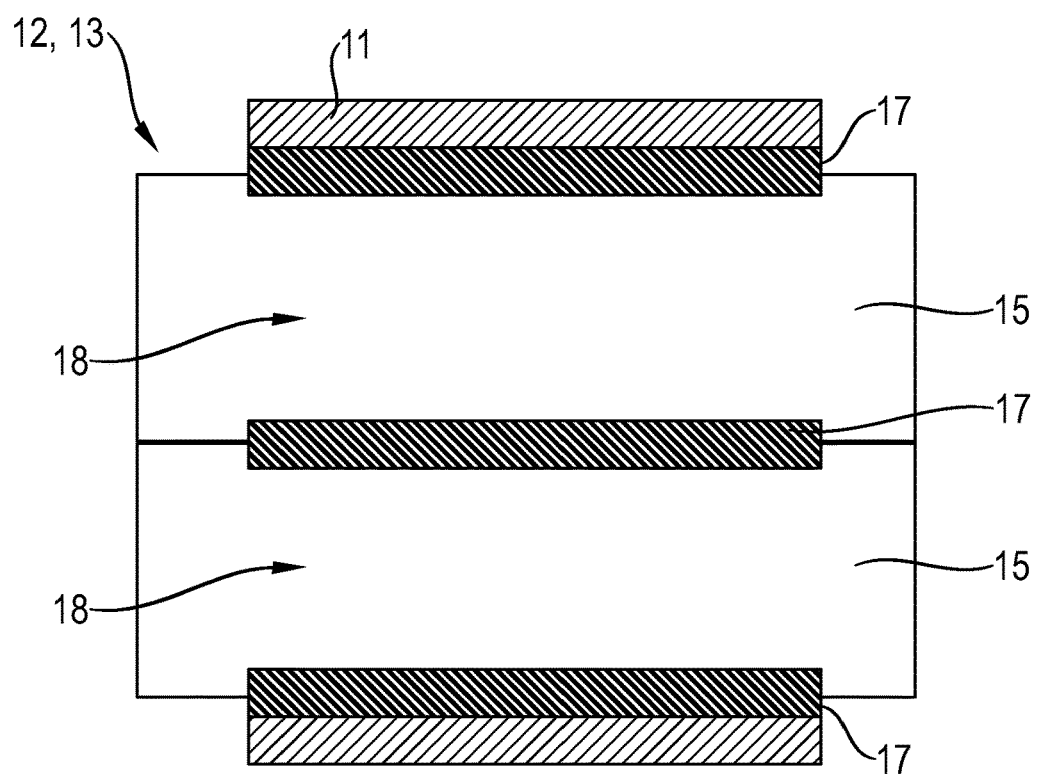
FIG. 4 is a cross section through the detail in FIG. 3.
Figure 5:
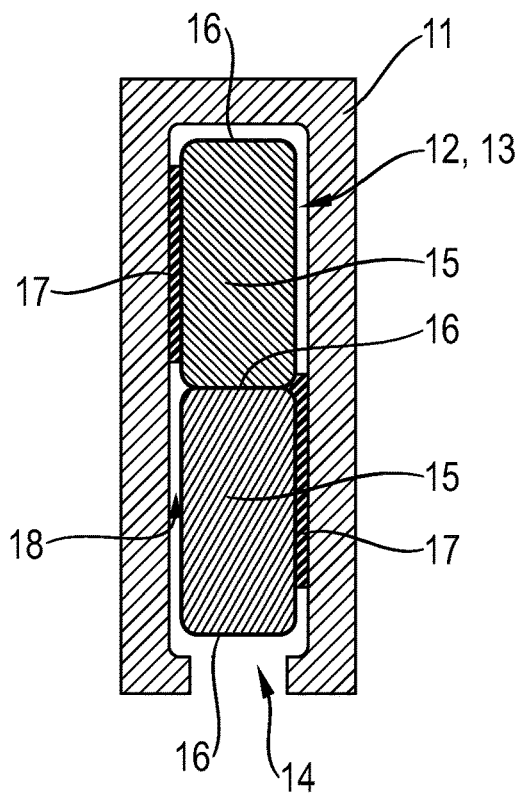
FIG. 5 shows a first alternative to the detail in FIG. 3.
Figure 6:
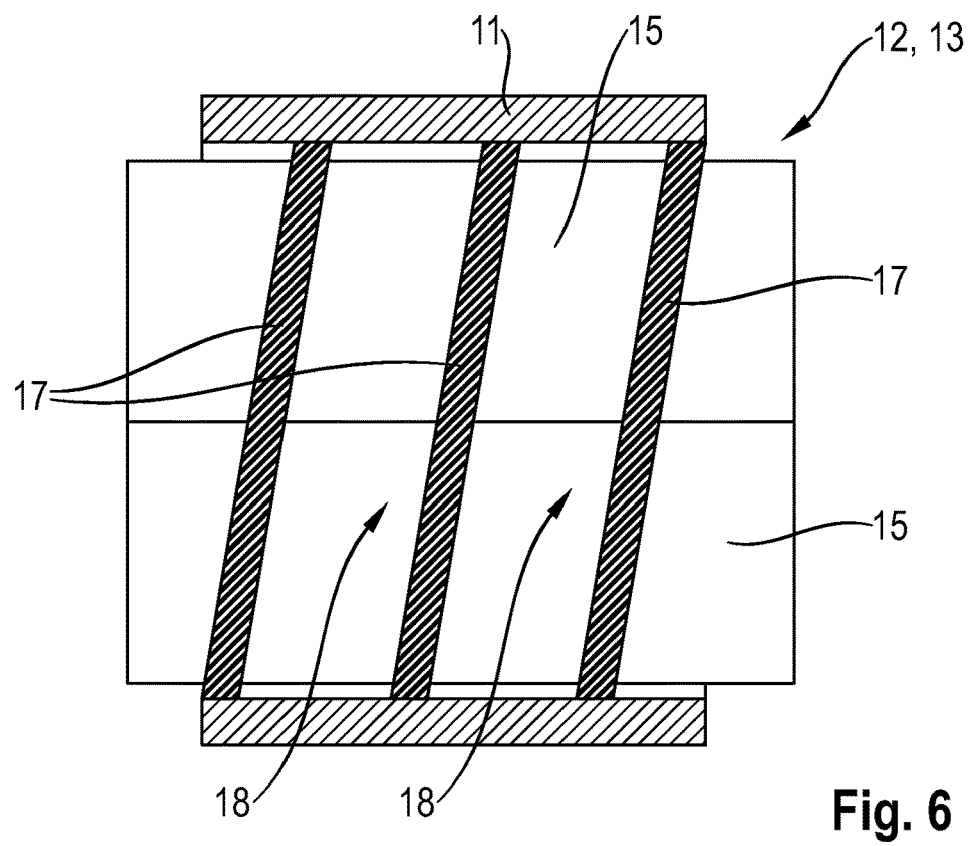
FIG. 6 is a cross section through the detail in FIG. 5.

FIGS. 5, 6 show an alternative to FIGS. 3, 4. The projections 17 in FIGS. 5 and 6 also extend in the axial direction of the conductor elements 15 but do not run in a rectilinear manner, as in FIGS. 3, 4, but rather in a helical or spiral manner around the winding segment 13 and therefore around the conductor elements 15 of the winding segment 13. Coolant channels 18 can also be provided in this manner and guide coolant along the conductor elements 15 of each winding segment 13 of the winding 12 to directly cool the conductor elements.

Figure 7:
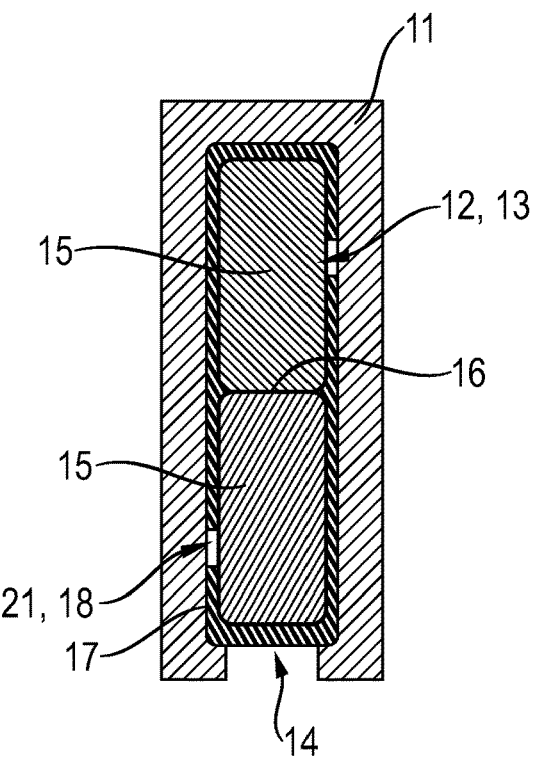
FIG. 7 shows a second alternative to the detail in FIG. 3.
Figure 8:
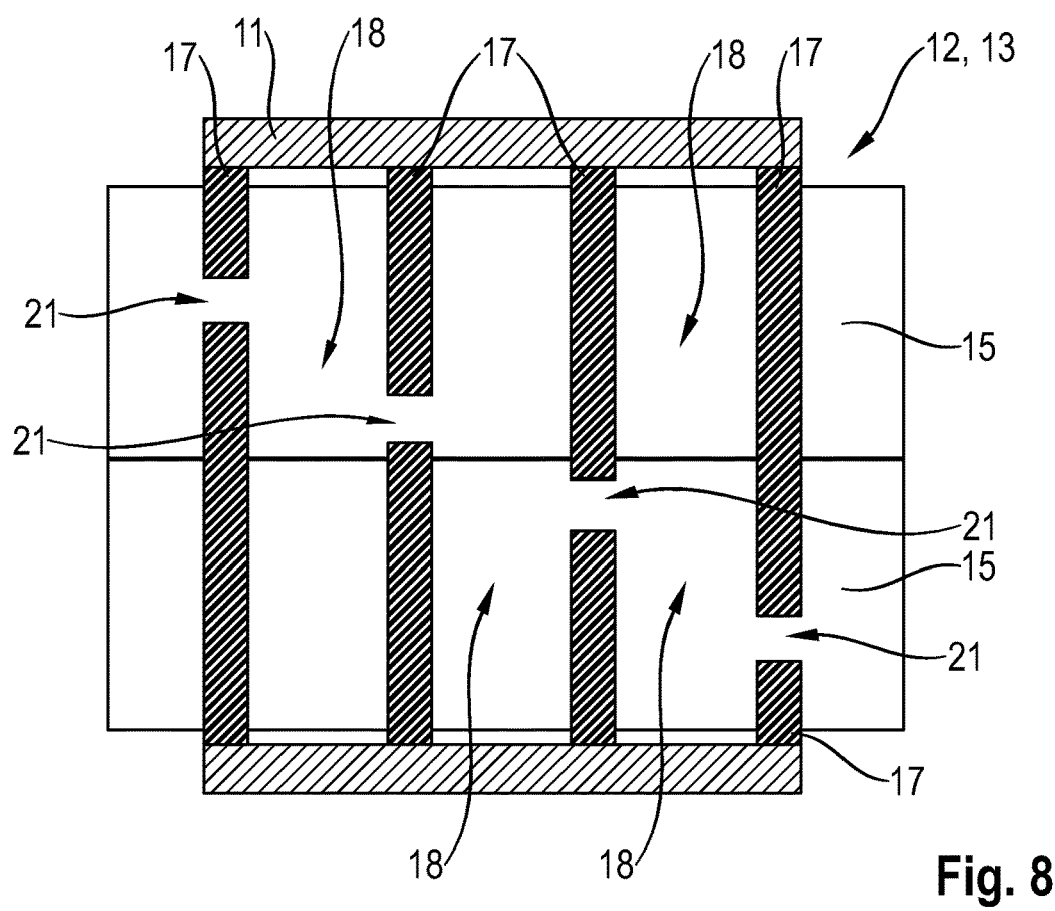
FIG. 8 is a cross section through the detail in FIG. 7.

FIGS. 7, 8 show another variant of a winding segment 13, in which the projections 17 extend in the peripheral direction of the conductor elements 15. Interruptions 21 then are formed at a plurality of peripheral positions and are used to guide the coolant in the axial direction of the conductor elements 15.

The projections 17 of the winding segments 13 are used as spacers and bound sections of coolant channels 18 and preferably are produced from a thermosetting plastic. Other electrical insulating materials can also be used.

Figure 9:
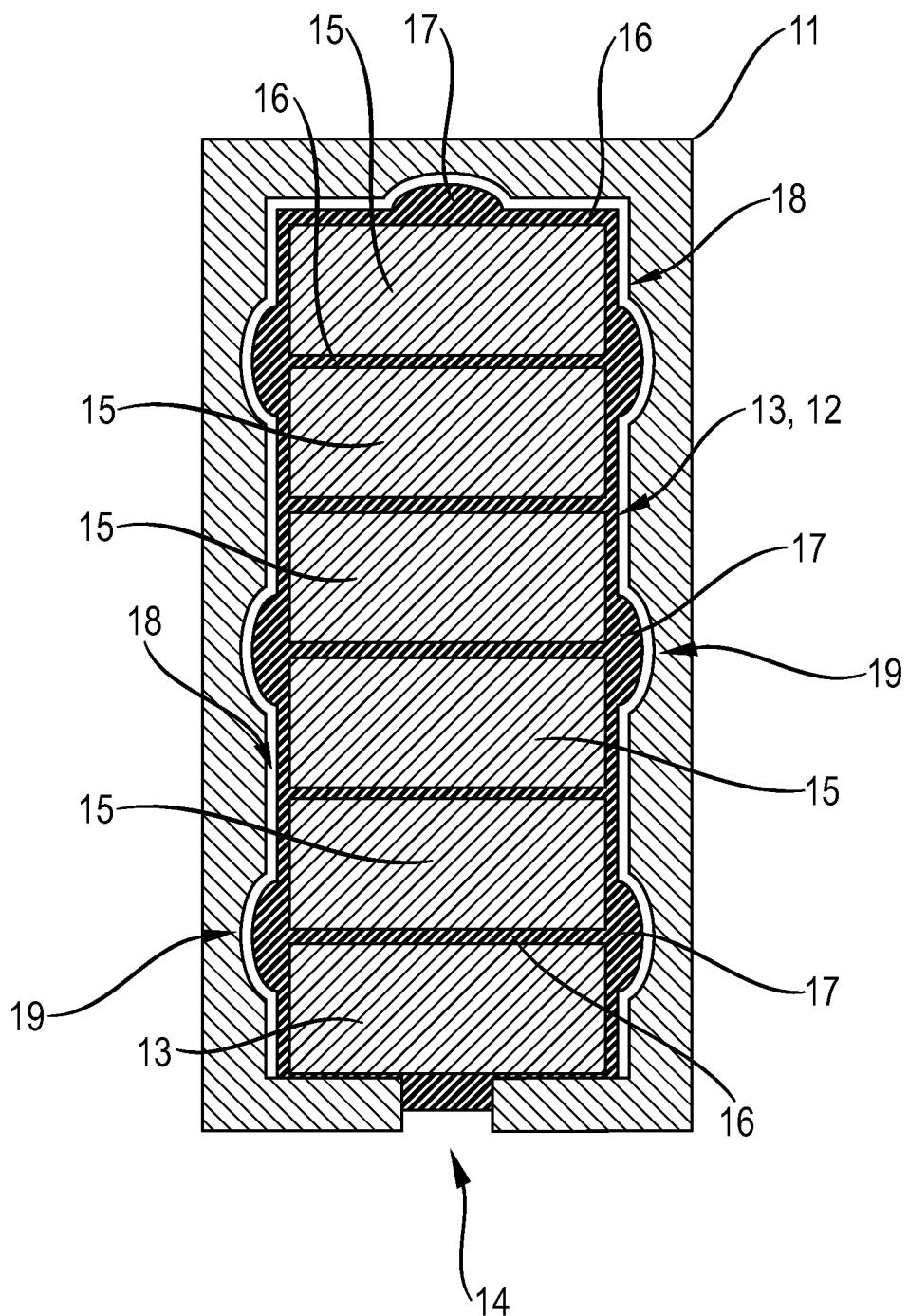
FIG. 9 shows a further alternative to the detail in FIG. 3.

The variant in FIG. 9 is configured so that the winding segment 13 has six conductor elements 15. Recesses 19 are made in the stator laminated core 11, namely in the region of the grooves 14 in the stator laminated core 11. The projections 17 of the respective winding segment 13 engage in sections in the recesses 19 and are used as spacers. This makes it possible to position the winding segment 13 in a defined manner in the respective groove 14 while providing a particularly compact design.

During insertion of the winding segments 13 or of the winding 11 into the grooves 14 in the stator laminated core 11, the spacers 17 protect the conductor elements 15 from damage. It is possible to dispense with groove base insulating paper which, in electrical machines known from practice, is arranged in the grooves 14 and is positioned between the respective winding segment 13 and the stator laminated core 11.

The projections 17 are applied to the electrically insulating insulation 16 of the conductor elements 15 in the central section of the conductor elements 15 in such a manner that the projections 17 cover between 10% and 50% (based on the height and width of the conductor element), preferably between 10% and 20%, of the insulation 16 and respectively leave the remainder free for the coolant channels 18 for directly cooling the conductor elements 15.

The invention also relates to a method for producing a winding 12 according to the invention for a stator 10 of an electrical machine.

A plurality of winding segments 13, the conductor elements 15 of which have the electrical insulation 16, are first of all provided.

The winding segments 13 are arranged in an injection mold.

Inside the injection mold, sections of the conductor elements 15, namely the insulation 16 of the conductor elements 15, are overmolded with an electrically insulating material so as to form the projections 17 that are used as spacers.

As already stated, these projections 17 bound sections of the coolant channels 18 for directly cooling the conductor elements 15.

The conductor elements 15 may be hairpin-like or U-shaped or rod-shaped conductor elements, that is to say so-called hairpin conductor elements or so-called I-pin conductor elements.

The winding 11 produced in this manner from winding segments 13 is arranged inside the stator laminated core 11, to be precise by inserting the winding segments into the grooves 14 in the stator laminated core 11, in which case, depending on whether hairpin conductor elements or I-pin conductor elements are used in the region of the winding segments 13, the conductor elements 15 then are connected in an electrically conductive manner either at one end 20 or at both ends 20 which each project from the stator laminated core 11.

What is claimed is:

1. A winding of an electrical machine, comprising
a plurality of winding segments,
each of the winding segments having at least first and second electrically conductive, hairpin-shaped or U-shaped or rod-shaped conductor elements,
each of the conductor elements of each of the winding segments being surrounded, in a central section thereof, by electrically insulating primary insulation while leaving ends of the conductor elements free of the primary insulation,
each of the conductor elements of each of the winding segments being connected in an electrically conductive manner to a conductor element of another of the winding segments at the ends,
the section of each of the conductor elements that has the primary insulation thereon having opposite first and second edge surfaces and opposite first and second planar side surfaces extending between the first and second edge surfaces, the first planar side surfaces of the primary insulation on the first and second conductor elements being aligned with one another in a first plane, and the second planar side surfaces of the primary insulation on the first and second conductor elements being aligned with one another in a second plane, and
projections made from an electrically insulating material, the projections projecting out from spaced-apart sections of the primary insulation on the planar side surfaces of each of the conductor elements so that each of the projections is spaced from and opposed to at least one other one of the projections to define side walls of coolant channels for directly cooling the conductor elements.

2. The winding of claim 1, wherein the projections extend in an axial direction of the conductor elements at positions spaced inward of the ends of the conductor elements.

3. The winding of claim 2, wherein the projections run in a rectilinear manner in the axial direction of the conductor elements between the ends of the conductor elements.

4. The winding of claim 2, wherein the projections run in a helical or spiral manner in the axial direction of the conductor elements between the ends of the conductor elements.

5. The winding of claim 1, wherein the projections run in a peripheral direction of the conductor elements and are interrupted at a plurality of peripheral positions.

6. The winding of claim 1, wherein the projections consist of a thermosetting plastic.

7. The winding of claim 1, wherein the projections are applied to the electrically insulating insulation on each of the conductor elements in such a manner that the projections cover between 10% and 50% of the electrically insulating insulation on each of the conductor elements and leave a remainder of the electrically insulating insulation on each of the conductor elements free for the coolant channels.

8. A stator of an electrical machine, comprising:
a stator laminated core; and
a winding that includes:
a plurality of winding segments,
each of the winding segments having at least first and second electrically conductive, hairpin-shaped or U-shaped or rod-shaped conductor elements,
each of the conductor elements of each of the winding segments being surrounded, in a central section thereof, by electrically insulating primary insulation while leaving ends of the conductor elements free of the primary insulation,
each of the conductor elements of each of the winding segments being connected in an electrically conductive manner to a conductor element of another of the winding segments at the ends, and
the section of each of the conductor elements that has the primary insulation thereon having opposite first and second edge surfaces and opposite first and second planar side surfaces extending between the first and second edge surfaces, the first planar side surfaces of the primary insulation on the first and second conductor elements being aligned with one another in a first plane, and the second planar side surfaces of the primary insulation on the first and second conductor elements being aligned with one another in a second plane, and
projections made from an electrically insulating material projecting out from spaced-apart sections of the insulation on the planar side surfaces of each of the conductor elements so that each of the projections is spaced from and opposed to at least one other one of the projections, each of the projections projecting out from the insulation of the respective conductor element into contact with the stator laminated core so that coolant channels for directly cooling the conductor elements are defined between the insulation of the conductor elements, the stator laminated core and two of the opposed projections.

9. The stator of claim 8, wherein the stator laminated core has grooves that accommodate the conductor elements of the winding segments of the winding the projections extending from the insulation of the respective conductor element into contact with a part of the stator laminated core that defines one of the grooves, so that the coolant channels lie within the grooves.

10. The stator of claim 9, wherein recesses are made in the grooves in the stator laminated core and the projections extending from the insulation of the respective conductor element into the recesses in the grooves in the stator laminated core.

* * * * *